April 8, 1952     H. KING     2,592,430
POULTRY NEST
Filed Dec. 26, 1947

Inventor.
HOMER KING.
By Farney + O'Connell
Attorneys.

Patented Apr. 8, 1952

2,592,430

UNITED STATES PATENT OFFICE 2,592,430

POULTRY NEST

Homer King, Orrville, Ohio

Application December 26, 1947, Serial No. 793,799

4 Claims. (Cl. 119—48)

This invention relates to poultry nests, and particularly to that type of poultry nest equipped to protect the eggs against soiling, breakage and overheating.

The general object of this invention is to provide a more practicable and efficient trap nest, as so-called in the industry. More specifically, among the objects of the invention is to provide a trap nest of such construction, combination and arrangement as lends itself to mass production at low cost, convenient substitution and/or interchange of components thereof as may be required or desired, and as will assure the production of eggs of a quality heretofore not attained by the now known forms of poultry nests.

In accordance with this invention, the nest box and egg receiving compartment are in the nature of individual units, each complete in itself, and so complement one another as to be readily assembled and/or separated as conditions of use may require. Also each unit is of simple and economical construction and designed for long life and a high order of performance of its intended functions.

The invention, together with its objectives and advantages, will be best understood from the following detailed description read in connection with the accompanying drawing, in which is illustrated a preferred embodiment of the invention, and wherein.

Figure 1:
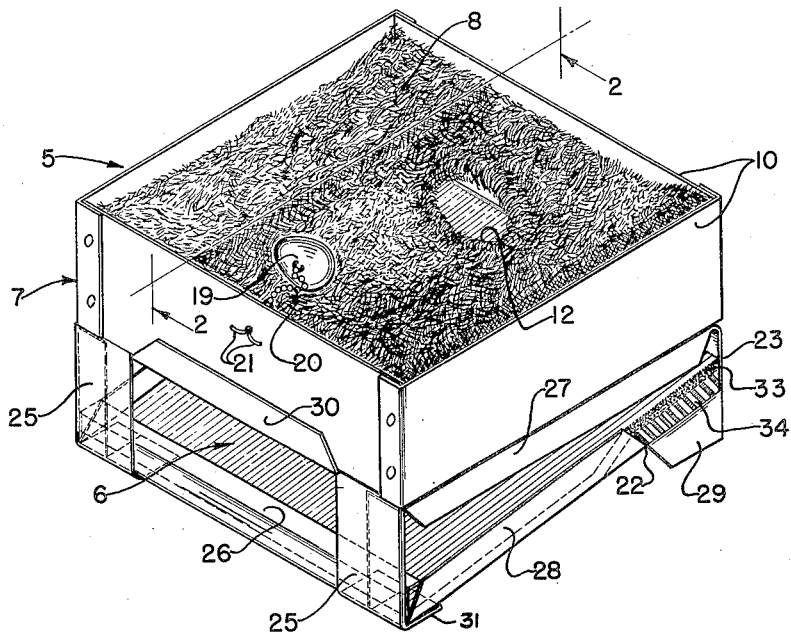
Figure 1 is a perspective view of a nest embodying the features of the present invention.

Referring more in detail to the drawing, the nest unit of the assembly is indicated by the numeral 5 and the egg-receiving compartment or unit by the numeral 6.

The nest unit 5 comprises a pan 7 and a padding 8 removably positioned within the pan. Pan 7 is formed from a single blank of sheet metal and has a bottom wall 9 from which rises an integral peripheral wall 10. Bottom wall 9 has a concavo-convex or dished out portion 11 provided with an aperture 12 through which the eggs will roll from the nest to the receiving compartment 6, arranged beneath the nest.

Padding 8 rests on the bottom 9 of the pan 7, and is composed of a base sheet 13 of felt to which are secured by stitching 17 superimposed layers 14, 15 of excelsior and a sheet 16 of screening or other reticulated material interposed between the layers 14, 15. In this manner a durable yet comfortable pad for the nest is provided.

Figure 2:
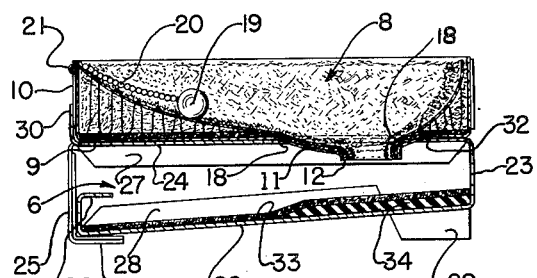
Figure 2 is a vertical, detailed, sectional view therethrough, taken substantially on the line 2—2 of Figure 1.
Figure 3:
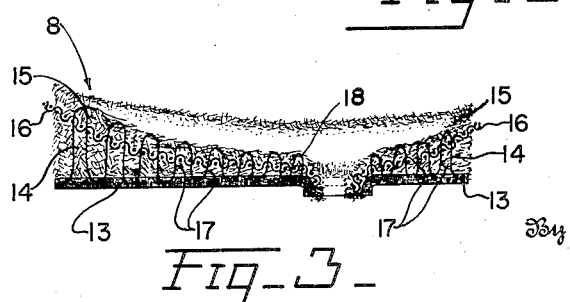
Figure 3 is a transverse sectional view through the nest padding forming a salient feature of this invention.

The top surface of padding 8 is concave, while the bottom rests flatly on the bottom wall 9 of pan 7, and has an apertured portion 18 that conformably fits the dished wall portion 11 and lines the opening 12, as clearly shown in Figures 2 and 3.

A salient feature of this invention is having a nest or decoy egg 19 freely movable, within limits, within the nest. To that end the egg 19 is suitably secured to one end of a length of chain or other flexible anchoring element 20 equipped with a cotter pin or the like 21 employed in a manner clearly shown in Figure 1 to secure the chain to the wall 10 of the nest pan. The freely movable decoy egg has been found to be more attractive to the hen and hence productive of better results than the stationary nest egg now generally employed.

Another important feature of this invention is the aforementioned egg-receiving chamber or unit 6. This unit is formed from sheet metal or similar material cut, shaped and dimensioned to provide as an integral structure a bottom wall 22, an end wall 23, a top wall 24, corner posts 25, an inverted L-shaped or overhanging end stop flange 26, side flanges 27 depending from top wall 24, side flanges 28 rising from bottom wall 22, legs 29 for supporting the egg-receiving chamber 6 with the bottom thereof at an incline as shown (Figures 1 and 2), and stop flange 30 rising from top wall 24, and against which one side of nest pan 7 abuts.

As is believed to be apparent, the fold lines between the walls 22, 23 and 24 of the egg-receiving chamber or unit 6 form, as it were, resilient connections between these walls permitting the egg receiving chamber or unit 6 to be readily restored to a flat or substantially flat condition to facilitate thorough cleaning of the egg-receiving compartment when desired. In this connection it may be mentioned that the sheet metal or other material from which the unit 6 is formed is releasably retained in the compartment forming condition shown by bending the free terminals of posts 25 into lapping engagement with the underside of bottom wall 22 and as indicated at 31.

In use, nest unit 5 rests on the top wall 24 of egg-receiving compartment unit 6, with the peripheral wall 10 of the nest unit abutting flange 30 and the dished portion 11 of the bottom wall of the nest pan fitting within an opening 32 provided in top wall 24 of the egg-receiving compartment, so that the nest unit is positively retained in position on the egg-receiving unit against casual displacement.

Removably lining the bottom of compartment 6 is a pad 33. This pad is preferably formed from a sheet of felt. At the end thereof located beneath openings 32 and 12, the pad has secured to the underside thereof a cushion 34 of sponge rubber or the like to soften the impact of the eggs rolling from the nest into the compartment 6. The eggs passing into compartment 6 will roll toward the flanged end 26 thereof. At the end 26 of the compartment access is had to the eggs for removing the same through the opening defined by the flange 26, flanged end 30 of wall 24, and corner posts 25.

Another salient feature of this invention is having the aperture 12 of the nest unit substantially oval-shaped, as shown, and as distinguished over the circular opening now generally employed in nests of this character, and through which the eggs pass from the nest to the egg-receiving compartment. By having the aperture 12 substantially ovate, the eggs will pass directly therethrough instead of bridging the opening as sometimes happens. This latter feature is undesirable in that it permits the egg to remain too long within the nest, thus increasing the possibility of the egg becoming dirtied, broken, or excessively heated.

From the foregoing it will be seen that the nest of this invention embodies several separate parts, each of which is of simple, durable, and economical construction, and wherein the several parts are readily separable, and easily manipulatable for thorough cleansing and sterilization. Also, from actual practice, it has been found that with a nest embodying the features of this invention, the eggs produced are of exceptionally high quality because of minimum breakage, soiling and overheating.

While I have shown and described only one embodiment of my invention, it is to be understood that I am not to be limited thereto and that changes may be made in the invention without departing from the spirit and scope of the claims.

What is claimed as new is:

1. A poultry nest comprising an egg-receiving compartment having an opening in the top wall thereof, a nest box on said top wall and having an apertured dished bottom portion conformably fitting the aperture in the top wall of the egg-receiving compartment, a padding within the nest box, and a decoy egg anchored for limited movement within the confines of the nest box.

2. A poultry nest comprising a nest box and an egg-receiving compartment in the nature of readily separable individual units, said egg-receiving compartment having a top wall provided with an aperture therein, and an upstanding flange adjacent one edge thereof, said nest box being adapted to rest on the top wall of the egg-receiving compartment in abutting contact with said flange and having a bottom provided with a dished apertured portion fitting the aperture in the top wall of the egg-receiving compartment through which eggs may pass from the nest box to the egg-receiving compartment, and a removable pad lining the bottom of the egg-receiving compartment.

3. A poultry nest comprising a nest box and an egg-receiving compartment in the nature of readily separable individual units, said egg-receiving compartment having a top wall provided with an aperture therein, and an upstanding flange adjacent one edge thereof, said nest box being adapted to rest on the top wall of the egg-receiving compartment in abutting contact with said flange and having a bottom provided with a dished apertured portion fitting the aperture in the top wall of the egg-receiving compartment through which eggs may pass from the nest box to the egg-receiving compartment, a removable pad lining the bottom of the egg-receiving compartment, an apertured pad lining the nest box, and a decoy egg anchored within the next box and freely movable therein.

4. A poultry nest including an egg-receiving compartment comprising a metal blank reversely folded to provide and egg-receiving base and a superimposed top wall, a nest box mounted on said top wall and provided with an egg opening communicating with the egg-receiving compartment, intermediate portions of said metal blank being bent downwardly to provide legs at the rear of the compartment to support the egg-receiving base at an inclination, said blank also presenting free terminals in extension of said top wall to provide yieldable posts adapted for flexing engagement with the egg-receiving base.

HOMER KING.

REFERENCES CITED

The following references are of record in the file of this patent:

UNITED STATES PATENTS

| Number | Name | Date |
|---|---|---|
| 811,156 | Lieske | Jan. 30, 1906 |
| 1,399,614 | Groves | Dec. 6, 1921 |
| 1,489,563 | Wahlborg | Apr. 8, 1924 |
| 1,578,692 | Thrasher | Mar. 30, 1926 |
| 1,984,193 | Lowe | Dec. 11, 1934 |
| 2,049,121 | Johnson | July 28, 1936 |
| 2,499,351 | Bietz | Mar. 7, 1950 |